United States Patent
Takei et al.

(10) Patent No.: US 8,588,692 B2
(45) Date of Patent: Nov. 19, 2013

(54) COMMUNICATION TERMINAL AND COMMUNICATION SERVICE DECISION METHOD

(75) Inventors: Kentaro Takei, Tokyo (JP); Sachiko Takeshita, Tokyo (JP); Daisaku Komiya, Kanagawa (JP); Maki Amishima, Kanagawa (JP); Ming Qiang Xu, Chiba (JP)

(73) Assignee: Panasonic Corporation, Osaka (JP)

( * ) Notice: Subject to any disclaimer, the term of this patent is extended or adjusted under 35 U.S.C. 154(b) by 683 days.

(21) Appl. No.: 11/575,223

(22) PCT Filed: Feb. 1, 2006

(86) PCT No.: PCT/JP2006/301688
§ 371 (c)(1),
(2), (4) Date: Mar. 14, 2007

(87) PCT Pub. No.: WO2006/082861
PCT Pub. Date: Aug. 10, 2006

(65) Prior Publication Data
US 2009/0061776 A1    Mar. 5, 2009

(30) Foreign Application Priority Data

Feb. 2, 2005   (JP) ................................. 2005-026687

(51) Int. Cl.
*H04B 7/00*   (2006.01)

(52) U.S. Cl.
USPC .......... 455/41.3; 455/4.2; 455/403; 375/222; 379/220.1

(58) Field of Classification Search
USPC ......... 455/41.3, 4.2, 403; 375/222; 379/220.1
See application file for complete search history.

(56) References Cited

U.S. PATENT DOCUMENTS 5,815,080 A    9/1998  Taguchi 7,203,226 B1 *   4/2007  Rabipour et al. ............. 375/222
2002/0150228 A1 *  10/2002  Umeda et al. ............ 379/220.01

FOREIGN PATENT DOCUMENTS

| EP | 1 531 581 A1 | 5/2005 |
|----|--------------|--------|
| JP | 06-153188 A  | 5/1994 |
| JP | 02/15630     | 2/2002 |
| JP | 2004-96743   | 3/2004 |
| JP | 2005-130287  | 5/2005 |

OTHER PUBLICATIONS

Naoki Imai et al., "Ubiquitous Resource Kankyo nu okeru SIP o Riyo shita Resource Sentaku Kirikae Kiko no Jisso to Hyoka", Information Processing Society of Japan Dai 66 Kai (Heisei 16 Nen) Senkoku Taikai Koen Ronbunshu (3), Mar. 9, 2004, 3H-4, pp. 3-219 to 3-220. Naoki Imai et al "Implementation and Assessment of Resource Selection and Switching System Using SIP in Ubiquitous Resource Environment" KDDI R&D Laboratories Inc.
Japanese Office action for JP2007-501597 dated Jan. 25, 2011.

* cited by examiner

*Primary Examiner* — Edward Urban
*Assistant Examiner* — Hsin-Chun Liao
(74) *Attorney, Agent, or Firm* — Pearne & Gordon LLP

(57) ABSTRACT

An object of the invention is to present service selection to the user immediately when it is made possible to realize a new service with a communication terminal of an associated party. A communication terminal 100 enables the user to use a communication service using a peripheral equipment within a communication range with an associated terminal connected through a network and includes a total control section 104 having a capability information change notification unit for notifying the associated terminal of occurrence of change in the peripheral equipment within the communication range and a service candidate determination unit for determining an available communication service with the associated terminal when change in the peripheral equipment occurs.

13 Claims, 9 Drawing Sheets

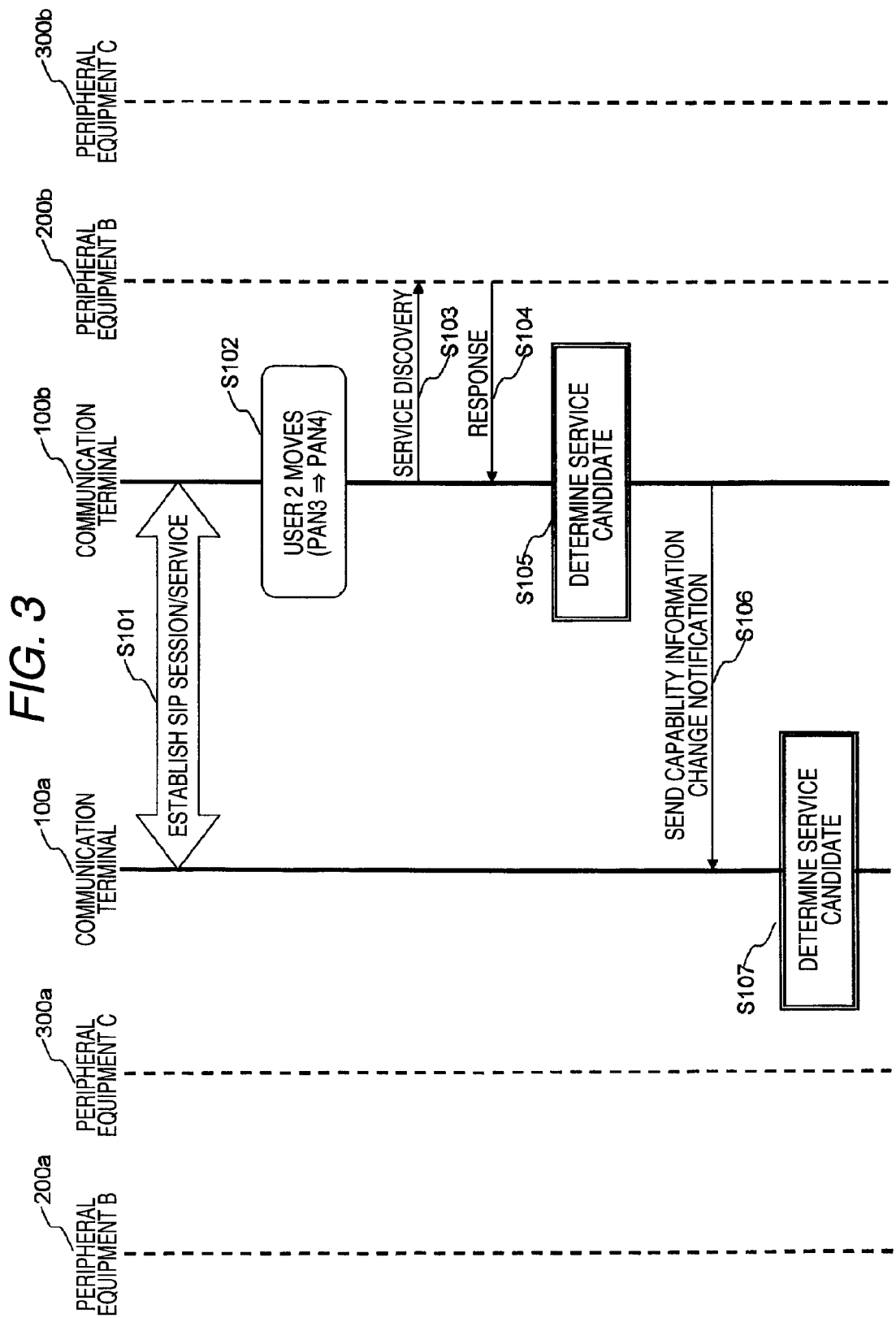

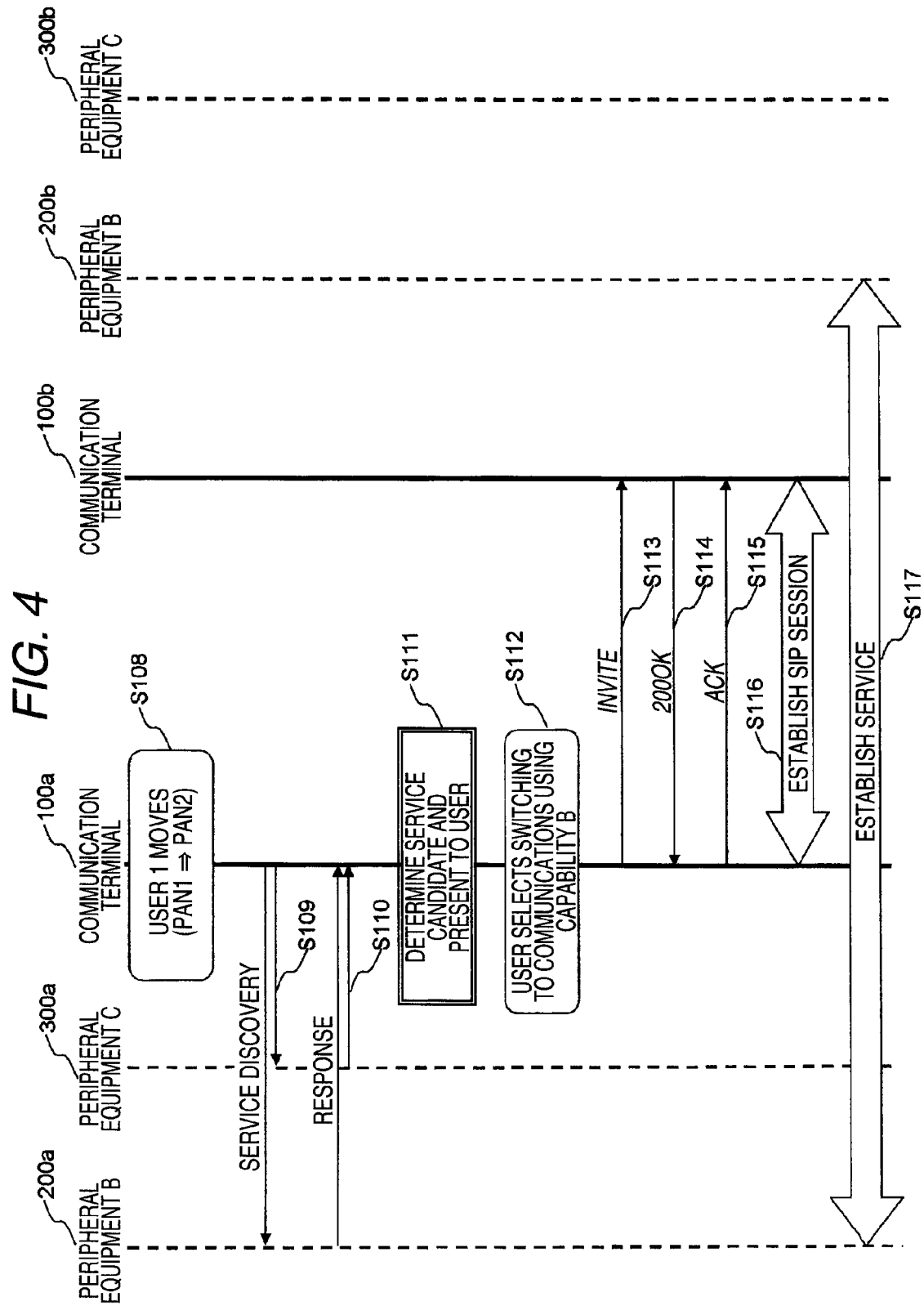

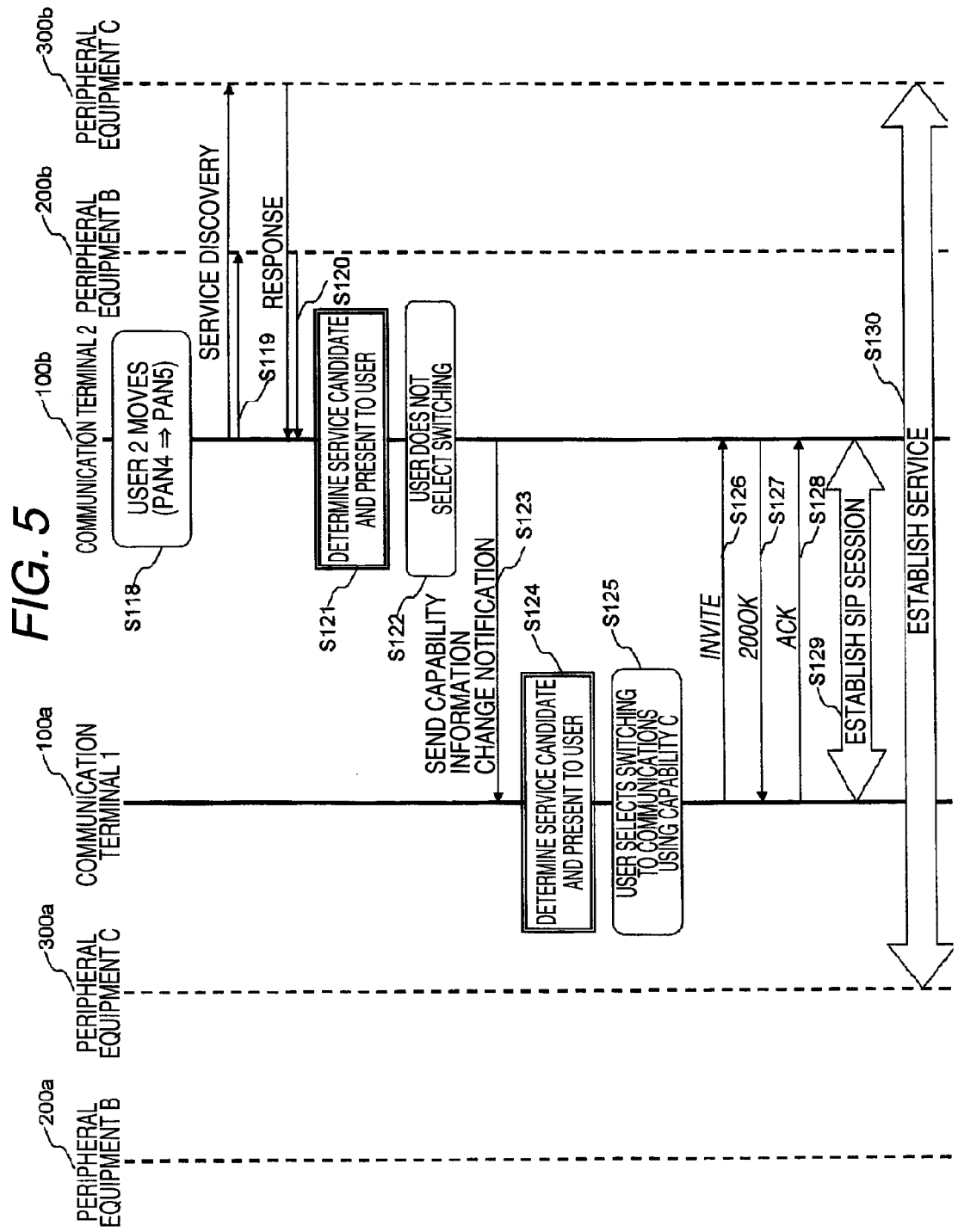

FIG. 6

| IP ADDRESS | 201.xxx.xxx.xxx |
|---|---|
| SIP ADDRESS | alice@atlanta.com |
| AVAILABLE CAPABILITIES | CAPABILITY A |

FIG. 7

| EQUIPMENT NAME | ADDRESS | HELD CAPABILITIES |
|---|---|---|
| PERIPHERAL EQUIPMENT B | 202. xxx. xxx. xxx | CAPABILITY B |
| PERIPHERAL EQUIPMENT C | 203. xxx. xxx. xxx | CAPABILITY C |

FIG. 8

| COMMUNICATION PARTY IP ADDRESS | 210.xxx.xxx.xxx |
|---|---|
| COMMUNICATION PARTY SIP ADDRESS | bob@billoxi.com |
| SESSION USE CAPABILITIES | CAPABILITY A |
| ASSOCIATED PARTY AVAILABLE CAPABILITIES | CAPABILITY A, CAPABILITY B |

FIG. 9

| ADDED CAPABILITIES | CAPABILITY B |
|---|---|
| DELETED CAPABILITIES | NONE |

COMMUNICATION TERMINAL AND COMMUNICATION SERVICE DECISION METHOD

TECHNICAL FIELD

This invention relates to an art for determining service that can be realized between communication terminals.

BACKGROUND ART

In recent years, various peripheral equipments such as household electric appliances and personal computers have been connected to a network. It will be made possible to connect a mobile terminal of a cell phone, a PDA, etc., possessed by the user and peripheral equipments wirelessly and enable the user to easily use the peripheral equipments in the vicinity of the user with the development of short distance wireless technologies of Bluetooth (registered trademark), UWB (Ultra WideBand), etc.

A network where a mobile terminal and peripheral equipments existing in the vicinity of the mobile terminal are connected by short distance wireless signal is called PAN (Personal Area Network). The mobile terminal and the peripheral equipments existing in the PAN are operated in cooperation with each other, whereby highly convenient service for the user can be realized. For example, it is made possible to realize a videophone, etc., using a large-sized TV in the PAN in place of a small screen of the mobile terminal as a display.

On the other hand, to establish communications between terminals, information concerning the capabilities of the terminals (capability information) is exchanged between the terminals and communications are conducted using which capability, namely, what service is realized between the terminals is determined. Generally, this procedure is called capability exchange. The possible types of capability information exchanged in the capability exchange are the types of codec and applications that can be used in the terminals, information concerning the device capabilities of the screen size, the CPU speed, etc. For example, if the codec types of audio and moving image as capability information are exchanged, one or more codecs to be used are determined from among the exchanged capability information pieces and transmission and reception of a media stream using the codec are realized as service between the terminals.

To realize communication service using peripheral equipments as components of a PAN by a mobile terminal, not only the capability information of the terminal, but also the capability information of the peripheral equipments that can be used in the PAN needs to be exchanged with the communication party to determine the service to be realized and the machines to be used.

In an art described in non-patent document 1, a terminal for conducting capability exchange conducts capability exchange with the communication party containing not only the capability information of the terminal, but also the capability information of the peripheral equipments in the PAN, thereby making it possible to select an appropriate machine and start or switch communications.

Non-patent document 1: "Implementation and analysis of a resource selecting/switching mechanism using SIP under Ubiquitous resource environment" March 2004, Naoki IMAI, Manabu ISOMURA, Hiroki HORIUCHI, in the 66th conference of Information Processing Society of Japan, 3H-4, 3-219 pages

DISCLOSURE OF THE INVENTION

Problems to be Solved by the Invention

In the related art described above, however, the capability information of the associated party can be acquired only when capability exchange to determine the service to be realized is conducted. Thus, if the composition of the peripheral equipments that can be used with the own terminal or the communication party, namely, the peripheral equipments as the components of the PAN changes with a move of the user, etc., and accordingly it is made possible to realize a new service between the terminal and the communication party, they cannot recognize change in the composition of the peripheral equipments at the point in time. Thus, the fact that a new service can be selected cannot be presented to the user at the appropriate timing; this is a problem.

Example 1

When Both can Conduct Communications with Each Other using Codec B

By way of example, the case where when communication terminals 1 and 2 conduct communications with each other using codec A, the user holding the communication terminals move and accordingly the peripheral equipments as the components of PANs of both the communication terminals change and it is made possible for both the communication terminals to conduct communications with each other using codec B is considered.

In this case, each of the communication terminals 1 and 2 cannot immediately recognize that it is made possible for the associated party to use a peripheral equipment having the codec B as capability. Thus, the users of the communication terminals 1 and 2 cannot select communications using the codec B as a new service.

Example 2

When One Cannot Use Codec B

The case where the user selects switching to communications using the codec B when it is made possible for the terminal of the user to use the codec B without knowing whether or not the associated party can use the codec B is considered. In this case, there is a possibility that capability exchange will end in a failure because the associated party cannot use codec B and processing for performing user's selection operation and capability exchange will come to naught.

Example 3

When Capability Information of Associated Party Already Changes at The Capability Exchange Time The case where the capability information of the associated party already changes when capability exchange is actually conducted is considered. In this case, there is a possibility that determination of service by capability exchange will result in a failure or that a delay will occur until completion of switching because capability exchange is again conducted from the beginning.

By way of example, the case where communication terminal 1 that can use applications A, B, and C and communication terminal 2 that can use applications A and B at the communication start time conduct capability exchange with each other and determine use of application A and start communications is considered.

(A: When it Becomes Impossible for Communication Terminal 2 to Use Application B)

Assume that after the communications are started, the user of the communication terminal 1 commands the communication terminal 1 to switch to communications using the application B and the communication terminal 1 again conducts capability exchange with the communication terminal 2. Then, it is possible that the communication terminal 2 may already move and the peripheral equipments that can be used may change, make it impossible to use the application B. In this case, determination of service by capability exchange ends in a failure and user's selection operation comes to naught.

(B: When it is Made Possible for Communication Terminal 2 to Use application C)

In contrast, it is also possible that when the communication terminal 1 starts capability exchange to switch to communications using the application B, it may be made possible for the communication terminal 2 to use the application C.

In this case, if it is known that the communication terminal 2 can conduct communications using the application C by the capability exchange at the time, the communication terminal 1 needs to again present the fact that communications using the application C can be selected to the user after the capability exchange.

Assume that the user selects communications using the application C. In this case, the communication terminal 1 needs to again conduct capability exchange with the communication terminal 2. This means that the previous user's operation of selecting communications using the application B and the later capability exchange procedure come to naught. Consequently, a delay until the final switching completion occurs.

It is therefore an object of the invention to provide a communication terminal and a communication service determination method that can present service selection to the user immediately when it is made possible to realize a new service with a communication terminal of an associated party.

Means For Solving the Problems

A communication terminal of the invention is a communication terminal for enabling to use the capabilities of the own terminal containing the functions of peripheral equipment group in the vicinity of the communication terminal for a communication service as capability information, the communication terminal comprising: a storing unit which stores capability information or capability information change of an associated terminal connected through a network; a notifying unit which detects change in the capability information of the own terminal in accordance with change in the composition of the peripheral equipment group and notifies the associated terminal of the change in the capability information of the own terminal as capability information change; a determining unit which determines an available communication service with the associated terminal based on the capability information of the own terminal and the capability information of the associated terminal in accordance with capability information change of the own terminal or the associated terminal; and a providing unit which provides a user with the available communication service with the associated terminal.

According to the configuration described above, when a new communication service becomes available, immediately the user can select switching to the communication service. The associated terminal can immediately be made to keep track of occurrence of change in the available communication services.

In the communication terminal of the invention, the capability information contains at least one of the types of codec and application that can be used in the terminal and information concerning the device capabilities containing the screen size and the CPU speed. The communication terminal includes a detecting unit which searches peripheral equipment group at regular time intervals using a short distance wireless facility and detects change in the composition of the peripheral equipment group. The communication terminal includes a detecting unit which monitors the radio wave state of the short distance wireless facility and detects change in the composition of the peripheral equipment group. The communication terminal includes a detecting unit which monitors position information provided by GPS and detects change in the composition of the peripheral equipment group. The communication terminal includes a detecting unit which detects change in the capability of a peripheral equipment that can be used. The communication terminal includes a setting unit which determines a common capability between the own terminal and the associated terminal based on the capability information of the own terminal and the associated terminal and sets the common capability as communication service. The communication terminal includes a determining unit which determines whether or not a new service that can be established is provided to the user in response to setting. The communication terminal includes a receiving unit which receives the capability information change from the associated terminal; and a determining unit which determines the available communication service with the associated terminal based on the capability information of the own terminal and the capability information of the associated terminal when the capability information change is received.

The communication terminal of the invention includes a notification mode control unit which controls the notification mode of the capability information change notification to the associated terminal. The notification mode control unit determines whether or not the notification is permitted. The notification mode control unit assigns priority information to the capability information and sends a notification. The notification mode control unit assigns preselection of use to the capability information and sends a notification.

According to the configuration described above, the communication terminal includes the notification mode control unit for controlling the notification mode of the capability information change notification to the associated terminal, whereby it is made possible to send notifications in various modes and the intention of the user can be more reflected on service determination made by the associated terminal.

A communication service determination method of the invention is a method for a communication terminal that can use the functions of a peripheral equipment group in the vicinity of the communication terminal for communications as the capabilities of the own terminal to determine an available communication service with an associated terminal with which the communication terminal conducts communications through a network, the communication service determination method comprising the steps of: storing capability information of the associated terminal; when capability information of the own terminal is changed in accordance with change in the composition of the peripheral equipment group, notifying the associated terminal of the change as capability information change; and when capability information of the own terminal is changed in accordance with change in the composition of the peripheral equipment group, determining an available communication service with the associated terminal.

Further, the communication service determination method of the invention includes the steps of receiving the capability information change from the associated terminal; and determining the available communication service with the associated terminal when the capability information change is received.

According to the invention, when a new communication service becomes available, immediately the user can select switching to the communication service. The associated terminal can immediately be made to keep track of occurrence of change in the available communication services.

BRIEF DESCRIPTION OF THE DRAWINGS

FIG. 3 is a chart (1) to show the operation of the whole system according to the embodiment of the invention.

FIG. 4 is a chart (2) to show the operation of the whole system according to the embodiment of the invention.

FIG. 5 is a chart (3) to show the operation of the whole system according to the embodiment of the invention.

FIG. 6 is a drawing to show a data example of own terminal information of the communication terminal according to the embodiment of the invention.

FIG. 7 is a drawing to show a data example of peripheral information of the communication terminal according to the embodiment of the invention.

FIG. 8 is a drawing to show a data example of session information of the communication terminal according to the embodiment of the invention.

FIG. 9 is a drawing to show a data example of a capability information change notification of the communication terminal in the embodiment of the invention.

Figure 1:
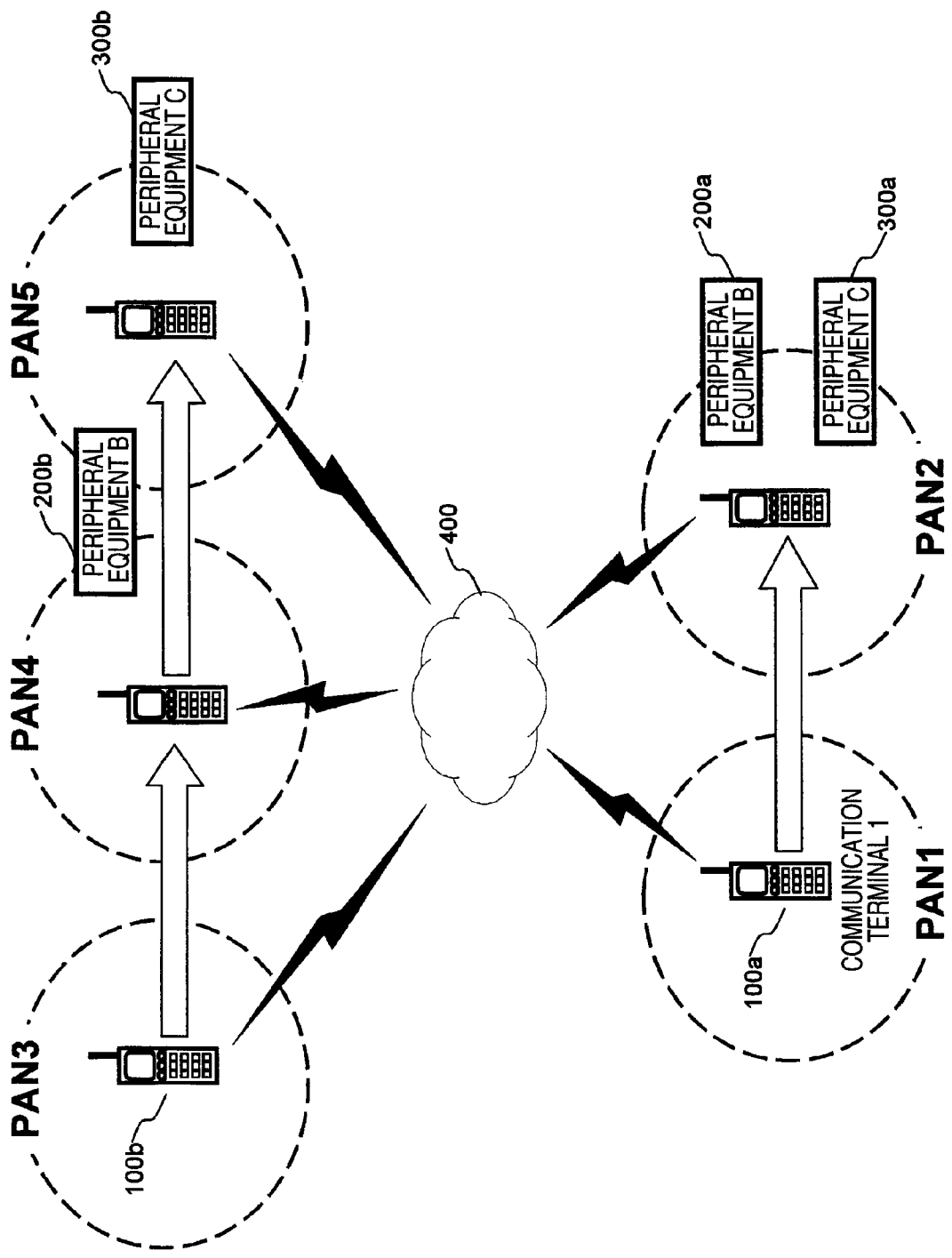
FIG. 1 is a drawing to show the schematic configuration of a communication system according to an embodiment of the invention.

DESCRIPTION OF REFERENCE NUMERALS 100, 100a, 100b Communication terminal
101 Input section
102 Output section
103 Device control section
104 Total control section
105 Own terminal information
106 Peripheral equipment information
107 Session information
108 Short distance wireless transmission-reception section
109 Network transmission-reception section
200a, 200b, 300a, 300b Peripheral equipment
400 Network

BEST MODE FOR CARRYING OUT THE INVENTION

An embodiment of the invention will be discussed with the accompanying drawings. FIG. 1 is a drawing to show the configuration of a system incorporating the embodiment of the invention. The system shown in FIG. 1 includes a communication terminal 100a and a communication terminal 100b connected to a network 400 and a peripheral equipment B 200a, a peripheral equipment C 300a, a peripheral equipment B 200b, and a peripheral equipment C 300b.

Hereinafter, the communication terminal 100a and the communication terminal 100b will be collectively called the communication terminal 100. The peripheral equipment B 200a, the peripheral equipment C 300a, the peripheral equipment B 200b, and the peripheral equipment C 300b will be collectively called the peripheral equipment.

The communication terminal 100 of the embodiment assumes a mobile terminal such as a cell phone or a PDA. The communication terminal 100 of the embodiment is connected to the network 400 in a wireless or wired manner. The communication terminal 100 and the peripheral equipment include each short distance wireless communication device in addition to a communication device through the network 400. Accordingly, the communication terminal 100 and the peripheral equipments existing in the vicinity of the communication terminal 100 are connected and make up a PAN.

The PAN changes as the communication terminal moves. FIG. 1 shows that a change is made from PAN1 to PAN2 with a move of the communication terminal 100a and that a change is made from PAN3 to PAN4 to PAN5 with a move of the communication terminal 100b. At the start time in the embodiment, the communication terminal 100a exists in PAN1 and the communication terminal 100b exists in PAN3 and since no peripheral equipment exists in the vicinity of each communication terminal, each communication terminal forms the PAN solely.

In the embodiment, SIP (Session Initiation Protocol) is used as the protocol for performing session control between the communication terminals 100a and 100b.

Figure 2:
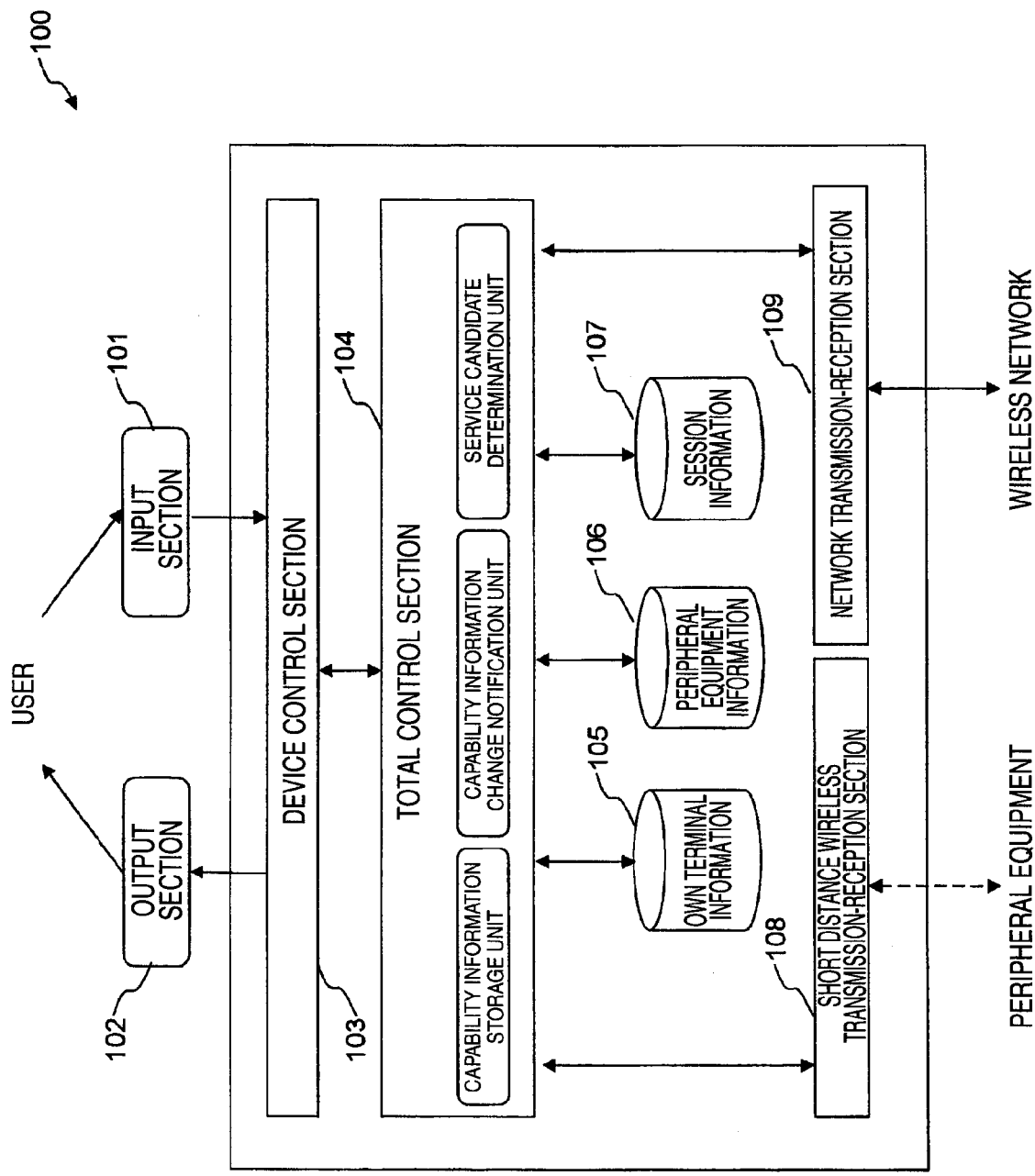
FIG. 2 is a diagram to show the schematic configuration of a communication terminal according to the embodiment of the invention.

FIG. 2 is a diagram to show the configuration of the communication terminal 100. The communication terminal 100 includes an input section 101 for accepting entry from the user, an output section 102 for outputting information to the user, a network transmission-reception section 109 for connecting to a cell phone network, a wireless network such as a WLAN, or a wire LAN, a short distance wireless transmission-reception section 108 using a short distance wireless facility to communicate with a peripheral equipment in the vicinity of the communication terminal 100, and a total control section 104 for controlling the whole of the communication terminal 100.

For example, Bluetooth (registered trademark), IrDA (Infrared Data Association), UWB (Ultra WideBand), etc., can be used as the short distance wireless facility.

The input section 101 has a function of accepting a command from the user and input of a media stream of audio, moving image, etc. The input section 101 is made up of devices such as a mouse and buttons for accepting entry from the user and devices such as a camera and a microphone for accepting input of media as hardware.

The output section 102 has a function of outputting information of audio, moving image, text data, etc. The output section 102 is made up of a display, a loudspeaker, an LED, etc., as hardware.

The input section 101 and the output section 102 are connected to a device control section 103. The device control section 103 has a function of sending information input from the input section 101 to the total control section 104. The device control section 103 also has a function of causing the output section 102 to output information received from the total control section 104.

The network transmission-reception section 109 has a function of receiving a command from the total control section 104 and transmitting and receiving a packet to and from the communication terminal 100 of the communication party and a peripheral equipment through the network 400.

The short distance wireless transmission-reception section 108 has a function of detecting the presence of a peripheral equipment in the vicinity of the communication terminal 100 using the short distance wireless facility and notifies the total control section 104 of the presence of the peripheral equipment. The short distance wireless transmission-reception section 108 also has a function of receiving a command from the total control section 104 and transmitting information to the peripheral equipment in the PAN using the short distance wireless facility. Further, upon reception of information from the peripheral equipment in the PAN using the short distance wireless facility, the short distance wireless transmission-reception section 108 has a function of sending the information to the total control section 104. In the embodiment, a service discovery message is transmitted to the peripheral equipment in the PAN and a response to the service discovery message from the peripheral equipment is received through the short distance wireless transmission-reception section 108.

FIG. 6 is a drawing to show an example of data stored in own terminal information 105 of the communication terminal 100.

The IP address of the SIP address of the communication terminal 100 and capability information of the communication terminal 100 are stored in the own terminal information 105. The capability information contains information concerning available capabilities indicating the types of codec, application, etc., that can be used and the device performance of the terminal such as the screen size, the resolution, and the CPU processing capability. In the description of the embodiment, only the available capabilities are handled as the capability information.

FIG. 7 is a drawing to show an example of data stored in peripheral equipment information 106 of the communication terminal 100. As information of each peripheral equipment in the PAN involving the communication terminal 100 (peripheral equipment existing in communication range), the name and the IP address of the peripheral equipment and the capability information of the machine are stored in the peripheral equipment information 106.

In FIG. 7, the available capabilities indicating the types of codec, application, etc., that can be used are stored as the capability information. At the start time of the embodiment, each of the communication terminals 100a and 100b involves no peripheral equipment in the PAN and thus no data is stored in the peripheral equipment information 106.

FIG. 8 is a drawing to show an example of data stored in session information 107 of the communication terminal 100. As information concerning the session conducted by the communication terminal 100, the IP address and the SIP address of the communication party establishing the session and the session use capabilities indicating the types of codec, application, etc., used in the session are stored in the session information 109. The associated party available capabilities are also stored as the capability information of the associated party acquired in capability exchange conducted in exchange of an SIP message at the session start time.

The total control section 104 has a function of controlling the whole of the communication terminal 100. The total control section 104 has a unit for storing the capability information of the communication terminal of the associated party acquired in capability exchange conducted when a session with another terminal is established or the session is updated in the session information 107. If the peripheral equipments as components of the PAN change with a move of the communication terminal 100 and accordingly the capability information of the communication terminal 100 changes, the total control section 104 has a unit for sending a capability information change notification of the description of the change (occurrence of change of peripheral equipment in the communication range) to the communication terminal of the associated party. Further, if the capability information of the communication terminal 100 changes with a move of the communication terminal 100 (if change of peripheral equipment occurs) or if a capability information change notification is received from the communication terminal of the associated party (if occurrence of change of peripheral equipment in the communication range of the communication terminal of the associated party is received), the total control section 104 has a unit for determining a new available service between the communication terminal 100 and the communication terminal of the associated party.

Next, the operation of the communication system according to the embodiment of the invention will be discussed with sequence charts of FIGS. 3 to 5. In the description that follows, the user holding the communication terminal 100a is called user 1 and the user holding the communication terminal 100b is called user 2. It is assumed that each of the peripheral equipments B 200a and B 200b can use the capability B and that each of the peripheral equipments C 300a an C 300b can use the capability C.

Each of the communication terminals 100a and 100b makes a service discovery to search for peripheral equipments at regular time intervals using the short distance wireless facility. As a result of the service discovery, each of the communication terminals 100a and 100b detects change in the composition of the peripheral equipments as the components of the PAN, namely, change in the available capabilities of the communication terminal 100a, 100b. Each of the communication terminals 100a and 100b acquires the capability information of the address, the available capabilities, etc., of each new peripheral equipment added to the PAN.

In the sequence in FIGS. 3 to 5, only service discovery when change in the PAN is shown. In fact, however, service discovery may be made in a state in which the component machines of the PAN do not change since service not contained in the sequence, namely, the previous service discovery was made.

The service discovery period may be determined by the total control section 104 of the communication terminal 100 in accordance with a preset interval or a service discovery may be made according to some trigger, such as acquisition of change in position information using GPS, detection of the presence of a peripheral equipment by monitoring the radio wave state of the short distance wireless facility in the short distance wireless transmission-reception section 108, or a user command, for example.

(When User 1 Exists in PAN1 and User 2 Exists in PAN3)

As shown in FIG. 3, at the start time of the embodiment, the communication terminal 100a establishes an SIP session with the communication terminal 100b (S101). In the embodiment, at this point in time, the communication terminals 100a and 100b have each the capability A as the available capabilities and establish the service using the capability.

If the capability A is a codec of audio and moving image, a media stream using the codec is exchanged or is distributed in one way. If the capability A indicates the application type or name, communications using the application of a videophone, chat, screen sharing etc., are conducted and a media stream, text data, application-specific data, etc., is exchanged.

Each of the communication terminals 100a and 100b stores "capability A" acquired in capability exchange conducted when the session is established in the associated party available capabilities of the session information 107.

(When User 1 Exists in PAN1 and User 2 Moves to PAN4)

From the state, the user 2 (communication terminal 100b) moves (S102). By making service discovery (S103, S104) after the move, the total control section 104 of the communication terminal 100b detects that the machines as components of the PAN change and the peripheral equipment B 200b becomes available through the short distance wireless transmission-reception section 108.

FIG. 1 shows the move of the user 2 and the PAN change as move of the communication terminal 100b from PAN3 to PAN4. The total control section 104 of the communication terminal 100b stores the capability information containing the address and the available capabilities of the peripheral equipment B 200b acquired by making the service discovery at the time in the peripheral equipment information 106. The total control section 104 of the communication terminal 100b additionally stores the capability that becomes available by using the peripheral equipment B 200b in the available capabilities of the own terminal information 105.

Accordingly, the available capabilities of the communication terminal 100b change from "capability A" to "capability A, capability B" and thus the total control section 104 of the communication terminal 100b determines a new service that can be established with the communication terminal 100a (S105). At this point in time, the available capabilities of the communication terminal 100a of the communication party are "capability A." Accordingly, the total control section 104 of the communication terminal 100b determines that there is no new service that can be established with the communication terminal 100a except the current established service using the capability A. Thus, the total control section 104 of the communication terminal 100b does not present service switching selection to the user 2 through the device control section 103 and the output section 102, and transmits a capability information change notification for notifying change in the capability information of the communication terminal 100b through the network transmission-reception section 109 to the communication terminal 100a (S106).

In the capability information change notification, only the difference from the information notified when the previous capability exchange was conducted with the communication terminal 100a or when the previous capability information change notification was transmitted to the communication terminal 100a may be notified or all capability information may be notified.

In the embodiment, in the capability information change notification, only the difference is notified and FIG. 9 shows an example of data contained in the capability information change notification. In FIG. 9, the fact that it is made possible for the communication terminal 100b to use the capability B newly is indicated in "added capabilities" as the difference from the preceding. Since there is no capability that becomes unavailable, no capability is described in "deleted capabilities" in FIG. 9. If there is a capability that becomes unavailable, the capability is described in "deleted capabilities" and a capability information change notification containing the deleted capability as well as the "added capabilities" is transmitted to the communication terminal 100a.

Upon reception of the capability information change notification from the communication terminal 100b through the network transmission-reception section 109, the total control section 104 of the communication terminal 100a determines which of capability addition and deletion the information contained in the notification is. In this case, the information is capability addition and therefore the total control section 104 of the communication terminal 100a stores the information in the session information 107. Here, the associated party available capabilities in the session information 107 of the communication terminal 100a are changed from "capability A" to "capability A, capability B."

The total control section 104 of the communication terminal 100a sees according to the capability information change notification that the capability information of the communication terminal 100b changes, and thus determines a new service candidate that can be established with the communication terminal 100b (S107). The total control section 104 determines that there is no new service that can be established with the communication terminal 100b except the current used capability A. Therefore, the total control section 104 of the communication terminal 100a does not present service switching to the user 1 through the device control section 103 and the output section 103.

(When User 1 Moves to PAN2 and User 2 Exists in PAN4)

Next, when the user 1 (communication terminal 100a) moves (S108), by making service discovery (S109, S110) after the move, the communication terminal 100a detects that the machines as components of the PAN change and the peripheral equipment B 200a and the peripheral equipment C 300a become available.

FIG. 1 shows the move of the user 1 and the PAN change as move of the communication terminal 100a from PAN1 to PAN2. The total control section 104 of the communication terminal 100a stores the capability information containing the addresses and the available capabilities of the peripheral equipments B 200a and C 300a acquired through the short distance wireless transmission-reception section 108 by making the service discovery at the time in the peripheral equipment information 106. The total control section 104 of the communication terminal 100a additionally stores the capabilities that become available by using the peripheral equipments B 200a and C 300a in the available capabilities of the own terminal information 105.

Accordingly, the available capabilities of the communication terminal 100a change from "capability A" to "capability A, capability B, capability C" and thus the total control section 104 of the communication terminal 100a determines a new service that can be established with the communication terminal 100b.

At this point in time, it is seen that the available capabilities of the communication terminal 100b are "capability A, capability B" from the session information 107 and thus the total control section 104 of the communication terminal 100a determines that it is made possible to establish a new service using the capability B with the communication terminal 100b, and presents selection as to whether or not to switch to the service to the user through the device control section 103 and the output section 102 (S111).

If the user selects switching to the service using the capability B, the communication terminal 100a executes a re-INVITE procedure of SIP with the communication terminal 100b and conducts capability exchange in the procedure and determines switching to the service using the peripheral equipment B having the capability B (S112).

First, the total control section 104 of the communication terminal 100a adds the description of the new service desired by the communication terminal 100a and the change description of the capability information of the communication terminal 100a resulting from the PAN change to a body part of the INVITE message and transmits the INVITE message through the network transmission-reception section 109 to the communication terminal 100b (S113).

FIG. 10(a) shows a data format example of the INVITE message. In FIG. 10(a), the service requested to be newly established in the session by the communication terminal 100a (session use capability), the address used for the communication terminal 100a in the service, namely, the address/port number (reception address/port) used by the peripheral equipment B 200a having the capability B for reception, and the capabilities that can be used by the communication terminal 100a at the current point in time (available capabilities) are added to the body part of the INVITE message.

The information pieces can be acquired from the own terminal information 105 and the peripheral equipment information 106. Of the information pieces, the available capabilities need not necessarily be added to the message. If the available capabilities are not added, a capability information change notification is transmitted to the communication terminal 100b aside from the capability exchange according to the INVITE procedure, thereby notifying the communication terminal 100b of change in the capability information of the communication terminal 100a.

Next, upon reception of the INVITE message from the communication terminal 100a through the network transmission-reception section 109, the total control section 104 of the communication terminal 100b acquires the new capability information of the communication terminal 100a stored in the body part of the INVITE message, namely, the available capabilities "capability A, capability B, capability C" of the communication terminal 100a. The total control section 104 of the communication terminal 100b stores the available capabilities in the associated party available capabilities of the session information 107.

The total control section 104 of the communication terminal 100b determines from the contents of the INVITE message that the communication terminal 100a makes a request for establishing a new service using the capability B. The total control section 104 of the communication terminal 100b inquires of the user 2 whether or not to switch to communications using the capability B through the device control section 103 and the output section 102. If the user 2 permits the switching or if setting is made so as to automatically permit switching, the total control section 104 of the communication terminal 100b transmits a 200 OK message of a success response to the INVITE message through the network transmission-reception section 109 to the communication terminal 100a (S114).

Figure 10:
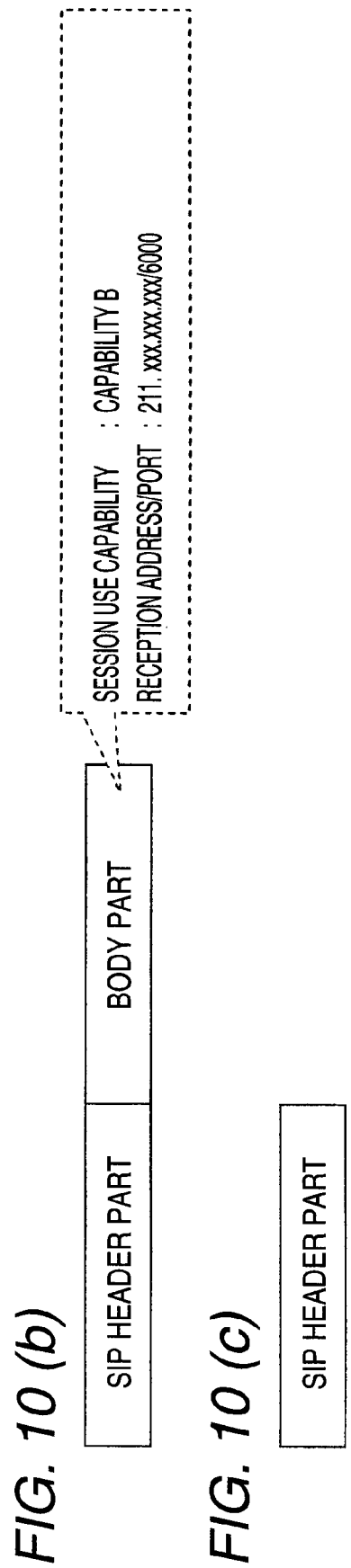
FIG. 10 is a drawing to show data format examples of an INVITE message.

FIG. 10 (b) shows a data example of the 200 OK message. In FIG. 10 (b), the service requested to be newly used by the communication terminal 100a (session use capability) and the address used by the communication terminal 100b in the service, namely, the address/port number (reception address/port) used by the peripheral equipment B 200b having the capability B for reception are added to the body part of the 200 OK message.

If the user does not permit the switching to the service using the capability B or if the switching is rejected based on the setting, the communication terminal 100b can reject the switching to the service using the capability B requested by the communication terminal 100a by transmitting a rejection response of SIP rather than a 200 OK message of a success response.

Next, upon reception of the 200 OK message from the communication terminal 100b through the network transmission-reception section 109, the total control section 104 of the communication terminal 100a determines that the communication terminal 100b accepts the switching to the service using the capability B. The total control section 104 of the communication terminal 100a changes the session use capability of the session information 107 from "capability A" to "capability B" and transmits an ACK message of a last response of SIP to the communication terminal 100b through the network transmission-reception section 109 (S115). The ACK message contains only an SIP header, as shown in FIG. 10 (c).

The processing as described above is performed, whereby while the communication terminal 100a and the communication terminal 100b establish the SIP session, the users can switch from the service using the communication terminals 100 to the service using the capability B possessed by the peripheral equipments B 200a and B 200b.

For example, if the capability A is an audio codec of G.711, etc., and the capability B is a moving image codec of MPEG, etc., and the communication terminals 100 are cell phones and the peripheral equipments B 200a and B 200b are PC terminals, it is possible that the users 1 and 2 may switch from voice communications using the cell phones to videophones using the PC terminals.

(When User 1 Exists in PAN2 and User 2 Moves to PAN5)

Next, the user 2 (communication terminal 100b) moves (S118) and by making service discovery (S119, S120) after the move, the total control section 104 of the communication terminal 100b detects that the machines as components of the PAN change and the peripheral equipment C 300b becomes available through the short distance wireless transmission-reception section 108.

FIG. 1 shows the move of the user 2 and the PAN change as move of the communication terminal 100b from PAN4 to PAN5. The total control section 104 of the communication terminal 100b stores the capability information containing the address and the available capabilities of the peripheral equipment C 200b acquired by making the service discovery at the time in the peripheral equipment information 106. The total control section 104 of the communication terminal 100b additionally stores the capabilities that become available by using the peripheral equipment C 300b in the available capabilities of the own terminal information 105.

Accordingly, the available capabilities of the communication terminal 100b change from "capability A, capability B" to "capability A, capability B, capability C." Thus, the total control section 104 of the communication terminal 100a determines a new service that can be established with the communication terminal 100b.

At this point in time, the total control section 104 of the communication terminal 100b sees that the available capabilities of the communication terminal 100b are "capability A, capability B, capability C" from the session information 107. Thus, the total control section 104 of the communication terminal 100b determines that it is made possible to establish a new service using the capability C with the communication terminal 100a in addition to the service based on the capability B used at present, and presents an inquiry as to whether or not to switch to the service to the user 2 through the device control section 103 and the output section 102 (S121).

In addition to the new service using the capability C that can be established, the communication terminal 100b can also establish a service using the capability A with the communication terminal 100a. Thus, it may also be presented to the user 2 as one of the options.

It is assumed that the user 2 does not select switching to the service or that the user 2 does not make any selection for a given time (S122). In this case, the total control section 104 of the communication terminal 100b transmits a capability information change notification for notifying change in the capability information of the communication terminal 100b, namely, that the capability C becomes newly available through the network transmission-reception section 109 to the communication terminal 100a (S123).

Upon reception of the capability information change notification through the network transmission-reception section 109 from the communication terminal 100b, the total control section 104 of the communication terminal 100a changes the associated party available capabilities in the session information 107 from "capability A, capability B" to "capability A, capability B, capability C." According to the change, the total control section 104 of the communication terminal 100a determines that that it is made possible to establish a new service using the capability C with the communication terminal 100b, and presents an inquiry as to whether or not to switch to the service to the user 1 through the device control section 103 and the output section 102 (S124).

It is assumed that the user selects switching to the service using the capability C. In this case, the communication terminal 100a executes a re-INVITE procedure of SIP with the communication terminal 100b in a similar manner that that at S113 to S115 (S126 to S128).

If the procedure results in success, while the communication terminal 100a and the communication terminal 100b establish the SIP session, the users 1 and 2 switch from communications using the capability B, namely, using the peripheral equipments 200a and 200b to communications using the capability C, namely, using the peripheral equipments 300a and 300b and start a new service.

Figure 11:
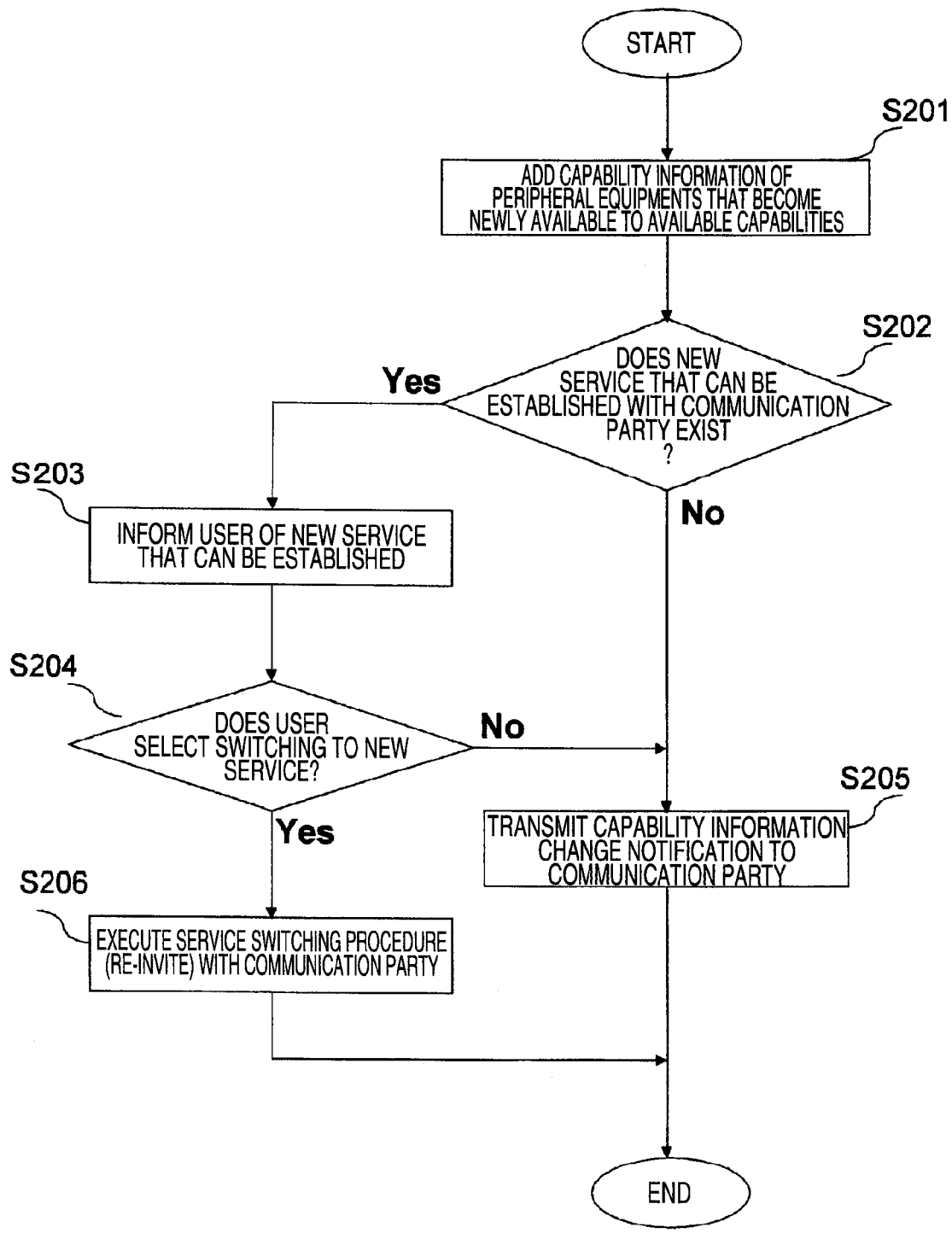
FIG. 11 is a flowchart (1) to show an internal processing flow of the communication terminal according to the embodiment of the invention.
Figure 12:
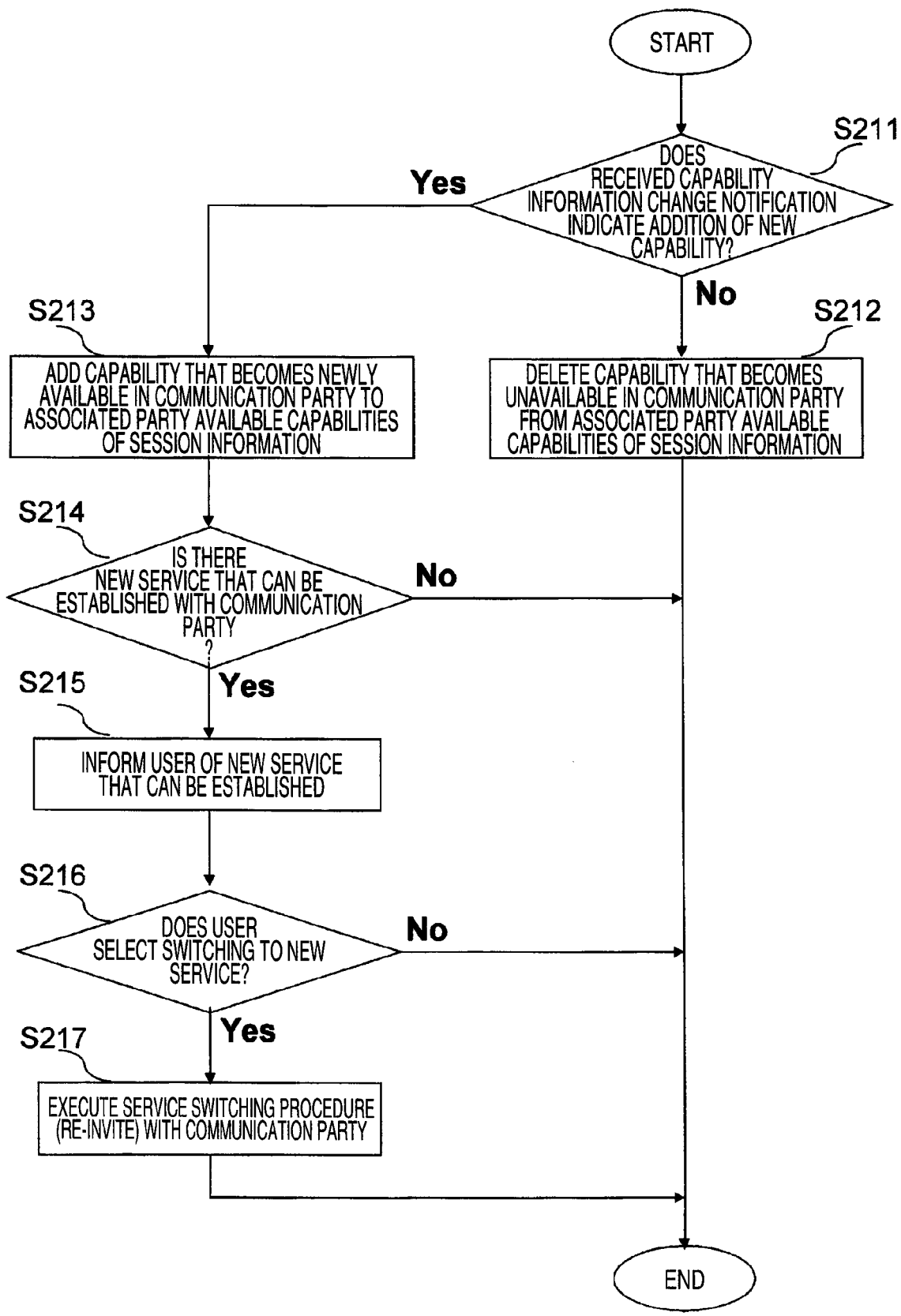
FIG. 12 is a flowchart (2) to show an internal processing flow of the communication terminal according to the embodiment of the invention.

Next, FIGS. 11 and 12 show internal operation flows of the communication terminal 100 when new peripheral equipments become available and when a capability information change notification is received from the communication terminal of the associated party, and the processing flows will be discussed below:

(When User 1 Moves to PAN2 and User 2 Exists in PAN4)

The case where the user 1 (communication terminal 100a) moves from the PAN 1 to the PAN2 and it is made possible to use the peripheral equipments B 200a and C 300a as shown in FIG. 1 will be discussed.

(FIG. 11; When New Peripheral Equipments Become Available)

As the Communication Terminal 100a Moves to the PAN2, the Short distance wireless transmission-reception section 108 detects the presence of the peripheral equipments B 200a and C 300a in the vicinity of the communication terminal 100a using the short distance wireless facility and the total control section 104 receiving a notification additionally stores the peripheral equipments B 200a and C 300a in the available capabilities of the own terminal information 105 (S201).

Next, the available capabilities of the own terminal information 105 of the communication terminal 100a are changed from "capability A" to "capability A, capability B, capability C" and thus the total control section 104 of the communication terminal 100a determines a new service that can be established with the communication terminal 100b. Since the available capabilities of the communication terminal 100b are "capability A, capability B" according to the session information 107, the total control section 104 of the communication terminal 100a determines that it is made possible to establish the new service using the capability B with the communication terminal 100b (Yes at S202).

Next, the total control section 104 of the communication terminal 100a informs the user that the new service using the capability B becomes available through the device control section 103 and the output section 102 (S203). If the user selects switching to the new service by pressing a button, etc., (Yes at S204), the total control section 104 of the communication terminal 100a detects the selection through the input section 101 and the device control section 103.

The total control section 104 of the communication terminal 100a conducts message exchanges for switching the service with the communication party 100b through the network transmission-reception section 109 (S206). Here, it is assumed that the user does not select switching to the service using the capability B (No at S204), in which case the total control section 104 of the communication terminal 100a transmits a capability information change notification to the communication terminal 100b through the network transmission-reception section 109 (S205) for notifying the communication terminal 100b that the capabilities B and C become available.

(FIG. 12; When Capability Information Change Notification is Received from Communication Terminal of Associated Party)

Upon reception of the capability information change notification transmitted by the communication terminal 100a through the network transmission-reception section 109, the total control section 104 of the communication terminal 100b determines whether the capability information change notification indicates capability addition to or capability deletion from the communication terminal 100a (S211).

If the notification indicates capability deletion (No at S211), the total control section 104 of the communication terminal 100b deletes the capability specified in the capability information change notification from the available capabilities of the communication terminal 100b in the session information 107 (S212).

Here, since the capability information change notification indicates that the capabilities B and C become newly available in the communication terminal 100a (Yes at S211), the total control section 104 of the communication terminal 100b additionally stores the capabilities B and C in the available capabilities of the communication terminal 100a in the session information 107 (S213). Accordingly, the available capabilities of the communication terminal 100a changes and thus the total control section 104 of the communication terminal 100a determines whether or not there is a new service that can be established with the communication terminal 100a (S214).

Here, if it is assumed that the communication terminal 100b is positioned in the PAN4, the total control section 104 of the communication terminal 100b sees that the available capabilities of the own terminal are "capability A, capability B" from the own terminal information 105. Since the available capabilities of the communication terminal 100a in the session information 107 are "capability A, capability B, capability C," the total control section 104 of the communication terminal 100b determines that it is made possible to establish the new service using the capability B with the communication terminal 100a (Yes at S214).

The total control section 104 of the communication terminal 100b informs the user that the new service using the capability B becomes available with the communication terminal 100a through the device control section 103 and the output section 102 (S215).

If the user selects switching to the service using the capability B by pressing a button, etc., (Yes at S216), the total control section 104 of the communication terminal 100b conducts message exchanges for switching the service with the communication party 100a through the network transmission-reception section 109 (S217).

The operation of the system of the embodiment has been described. In the embodiment, the communication terminals 100a and 100b for conducting communications store mutually the capability information of the associated terminal and if the available peripheral equipment in the PAN changes with a move of the user, the associated terminal is notified of the change as change in the capability information of the own terminal. Accordingly, the embodiment has the advantage that if the capability information of the own terminal or the associated terminal changes, the new service that can be established with the associated terminal cab be determined immediately and it is made possible for the user to select the service. Therefore, wasted operation of selecting an actually unavailable communication service and again selecting from the beginning can be prevented.

In the embodiment described above, only the available capabilities of the codec and application types, etc., are handled as the capability information; in addition, however, information concerning the device performance of the terminal such as the screen size, the resolution, the CPU processing capability, etc., of each of the communication terminal 100 and the peripheral equipment may be used as the capability information.

For example, if a peripheral equipment that can use the same codec as the communication terminal 100 and has a larger screen size become available, it is determined change in the capability information of the own terminal and switching selection is presented to the user and a capability information change notification is transmitted to the associated party. According to the notification, it is made possible for the user of the own terminal or the associated terminal to select switching to a service using the larger screen size although the codec is the same.

As a part of the capability information, the priority of each available capability or specification of preselection of each available capability may be sent to the associated terminal. Specifically, if there are a plurality of available capabilities of the own terminal, the priority information is assigned to the available capabilities and a notification is sent to the associated terminal, so that the intention of the user of the own terminal can be more reflected on service determination made by the associated terminal.

If the unavailable capability in the associated terminal at the current point in time becomes available with a move of the user, preselection information of switching to the service using the available capability (preselection of use of peripheral equipment) is contained in a capability information change notification and the capability information change notification is sent to the associated terminal. The notification of the preselection information instructs the associated terminal to cause switching processing to start when the capability becomes available, whereby it is made possible to immediately switch to the service using the capability.

In the embodiment described above, whenever the capability information is changed due to change in the available peripheral equipment with the communication terminal 100 with a move of the user, the associated terminal is notified of the change description, but whether or not the associated terminal is to be notified (whether or not the notification is permitted) may be determined based on one determination criterion.

For example, if a new peripheral equipment becomes available, the user is inquired whether or not the machine is to be used or whether or not the machine is to be used is determined based on setting, whereby if it is determined that the machine is not used, sending a capability information change notification to the associated terminal may be skipped.

In the embodiment described above, if the service that can be realized changes and the user selects switching, the service is switched, but similar processing can also be applied to service addition rather than service switching.

For example, if it is made possible for the user 1 and the user 2 to use displays having the same moving image codec from a state in which both the users conduct voice communications using the communication terminals 100, video communications using the displays can be realized as service addition with the voice communications continued using the communication terminals 100.

In the embodiment described above, the initiative for establishing service may be switched from the communication terminal 100 to a peripheral equipment or between peripheral equipments with the SIP session maintained between the communication terminals 100a and 100b, but the SIP session may be switched at the same time as service switching. Using a REFER procedure of a transfer procedure of SIP, the SIP session switching can be realized.

As described above, the invention has the advantage that if the service that can be realized with the communication terminal of the associated party changes, immediately it is made possible for the user to select the service, and is useful in a terminal switching system for switching the service, the terminal used by the user while continuing communications or the like. Occurrence of a retry of user's selection operation or capability exchange can be prevented and the time to switching completion can be reduced.

While the invention has been described in detail with reference to the specific embodiments, it will be obvious to those skilled in the art that various changes and modifications can be made without departing from the spirit and the scope of the invention.

This application is based on Japanese Patent Application (No. 2005-026687) filed on Feb. 2, 2005, which is incorporated herein by reference.

INDUSTRIAL APPLICABILITY

The invention has the advantage that when a new communication service becomes available, immediately the user can select switching to the communication service, and is useful for an art for determining the service that can be realized between the communication terminals or the like.

The invention claimed is:

1. A communication terminal for enabling to use the capabilities of the own terminal containing the functions of a peripheral equipment device group communicable in wireless with the communication terminal in the vicinity of the communication terminal for a communication service as capability information, the communication terminal comprising:

a short-distance wireless transmission/reception section which monitors a radio wave state of a short distance wireless facility and detects change in the composition of the peripheral equipment device group;

a storing unit which stores capability information or capability information change of an associated terminal that is a communications counterparty of said communication terminal, that is connected through a network to said communication terminal, and that is currently engaged in a previously-initiated communication session with said communication terminal, wherein the communication terminal and the associated terminal exchange respective capability information when the communication session starts;

a detecting unit which detects change in the capability information of the own terminal when the short-distance wireless transmission/reception section has detected the change in the composition of the peripheral equipment device group, which is in a Personal Area Network with the own terminal;

a notifying unit which notifies the associated terminal of the change in the capability information of the own terminal as capability information change when the detecting unit has detected the change in the capability information of the own terminal during the previously-initiated communication session with said associated terminal;

a receiving unit which receives capability information change from the associated terminal, during the previously-initiated communication session with said associated terminal;

a determining unit which determines an available communication service with the associated terminal, based on a comparison of the capability information of the own terminal including information about the peripheral equipment device group in the Personal Area Network with the own terminal and the capability information change of the associated terminal including information about a peripheral equipment device group communicable in wireless with the associated terminal in a Personal Area Network with the associated terminal, and at a timing in accordance with the reception of the capability information change of the associated terminal, such that the reception of the capability information change of the associated terminal results in a determination of the available communication service with the associated terminal by the determining unit during the previously-initiated communication session with said associated terminal, wherein the Personal Area Network with the own terminal and the Personal Area Network with the associated terminal are different personal area networks, and wherein the capability information change of the associated terminal concerns a change in the Personal Area Network with the associated terminal due to a presence of a new peripheral equipment device communicable in wireless with the associated terminal in the Personal Area Network with the associated terminal, and wherein the available communication service is a newly available service due to the presence of both of the new peripheral equipment device in the Personal Area Network with the associated terminal and a corresponding peripheral equipment device communicable in wireless with the own terminal in the Personal Area Network with the own terminal, and the newly available service uses both of the new peripheral equipment and said corresponding peripheral equipment device; and a providing unit configured to provide a user with the available communication service with the associated terminal, wherein Session Initiation Protocol is used for performing session control between the own terminal and the associated terminal.

2. The communication terminal according to claim 1 wherein the capability information contains at least one of the types of codec and application that can be used in the own terminal and information concerning the device capabilities containing the screen size and the CPU speed.

3. The communication terminal according to claim 1, wherein the detecting unit searches the peripheral equipment device group in the Personal Area Network with the own terminal at regular time intervals using the short distance wireless facility and detects change in the composition of the peripheral equipment device group in the Personal Area Network with the own terminal.

4. The communication terminal according to claim 1, wherein the detecting unit monitors a radio wave state of the short distance wireless facility and detects change in the composition of the peripheral equipment device group in the Personal Area Network with the own terminal.

5. The communication terminal according to claim 1, wherein the detecting unit monitors position information provided by GPS and detects change in the composition of the peripheral equipment device group in the Personal Area Network with the own terminal.

6. The communication terminal according to claim 1, wherein the detecting unit detects change in the capability of a peripheral equipment device that can be used.

7. The communication terminal according to claim 1, comprising a setting unit which determines a common capability between the own terminal and the associated terminal based on the capability information of the own terminal and the associated terminal and sets the common capability as communication service.

8. The communication terminal according to claim 1, wherein the determining unit determines whether or not the newly available service that can be established is provided to the user in response to setting.

9. The communication terminal according to claim 1, comprising a notification mode control unit which controls the notification mode of the capability information change notification to the associated terminal.

10. The communication terminal according to claim 9, wherein the notification mode control unit determines whether or not the notification is permitted.

11. The communication terminal according to claim 9, wherein the notification mode control unit controls the notification mode by assigning priority information to the capability information and sending a notification.

12. The communication terminal according to claim 9, wherein the notification mode control unit controls the notification mode by assigning preselection of use to the capability information and sending a notification.

13. A communication service determination method for a communication terminal that can use the functions of a peripheral equipment device group communicable in wireless with the communication terminal in the vicinity of the communication terminal for communications as the capabilities of the own terminal to determine an available communication service with an associated terminal with which the communication terminal conducts communications through a network, the communication service determination method comprising the steps of:

monitoring a radio wave state of a short distance wireless facility and detecting change in the composition of the peripheral equipment device group;

establishing communications with the associated terminal as a communications counterparty through the network, including exchanging respective capability information with the associated terminal when establishing the communications;

communicating with the associated terminal during a communication session after establishing the communications with the associated terminal;

storing the capability information of the associated terminal;

detecting change in the capability information of the own terminal upon detecting the change in the composition of the peripheral equipment device group, which is in a Personal Area Network with the own terminal;

when capability information of the own terminal is changed in accordance with detecting the change in the composition of the peripheral equipment device group, notifying the associated terminal of the change as capability information change during the communication session after establishing the communications with the associated terminal;

receiving capability information change from the associated terminal during the communication session after establishing the communications with the associated terminal; and when the capability information change of the associated terminal is received and at a timing in accordance with receiving the capability information change from the associated terminal, determining an available communication service with the associated terminal based on a comparison of the capability information of the own terminal including information about the peripheral equipment device group in the Personal Area Network with the own terminal and the capability information change of the associated terminal including information about a peripheral equipment device group communicable in wireless with the associated terminal in a Personal Area Network with the associated terminal, such that said receiving the capability information change from the associated terminal results in said determining the available communication service with the associated terminal, said determining the available communication service with the associated terminal occurring during the communication session after establishing the communications with the associated terminal, wherein the Personal Area Network with the own terminal and the Personal Area Network with the associated terminal are different personal area networks, and wherein the capability information change of the associated terminal concerns a change in the Personal Area Network with the associated terminal due to a presence of a new peripheral equipment device communicable in wireless with the associated terminal in the Personal Area Network with the associated terminal, and wherein the available communication service is a newly available service due to the presence of the new peripheral equipment device in the Personal Area Network with the associated terminal and a presence of a corresponding peripheral equipment device communicable in wireless with the own terminal in the Personal Area Network with the own terminal, and the newly available service uses both of the new peripheral equipment and said corresponding peripheral equipment device, and wherein Session Initiation Protocol is used for performing session control between the own terminal and the associated terminal.

* * * * *